United States Patent
Kouguchi

(10) Patent No.: US 8,780,410 B2
(45) Date of Patent: Jul. 15, 2014

(54) IMAGE PROCESSING APPARATUS

(71) Applicant: Masatsugu Kouguchi, Hachioji (JP)

(72) Inventor: Masatsugu Kouguchi, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 67 days.

(21) Appl. No.: 13/669,509

(22) Filed: Nov. 6, 2012

(65) Prior Publication Data

US 2013/0120774 A1    May 16, 2013

(30) Foreign Application Priority Data

Nov. 11, 2011  (JP) .................... 2011-247347

(51) Int. Cl.
H04N 1/60 (2006.01)
G06F 3/12 (2006.01)

(52) U.S. Cl.
USPC ........... 358/1.9; 358/1.15; 358/2.1; 358/1.16; 358/518; 358/520

(58) Field of Classification Search
None
See application file for complete search history.

(56) References Cited

U.S. PATENT DOCUMENTS 8,233,178 B2 * 7/2012 Robinson et al. ............ 358/1.15
2006/0274341 A1 * 12/2006 Kumada et al. ............... 358/1.9

FOREIGN PATENT DOCUMENTS

| JP | 9-193477 A | 7/1997 |
| JP | 2007-97171 A | 4/2007 |
| JP | 2008-92312 A | 4/2008 |
| JP | 2010-141409 A | 6/2010 |
| JP | 2011-29984 A | 2/2011 |

OTHER PUBLICATIONS

Japanese Office Action dated Sep. 3, 2013, issued by the Japanese Patent Office in corresponding Japanese Patent Application No. 2011-247347, and English language translation of Office Action. (11 pages).

* cited by examiner

Primary Examiner — Quang N Vo
(74) Attorney, Agent, or Firm — Buchanan Ingersoll & Rooney PC

(57) ABSTRACT

An image processing apparatus includes a storage unit and a control unit. The control unit analyzes and rasterizes print data; generates raster data represented by a first color value in a first color space, color space information indicating the first color space, and specific color information indicating that the first color value is a specific color value; stores the raster data in association with the color space information and the specific color information; determines whether the specific color information exists; converts the first color value into a second color value in a second color space of an output device if the specific color information does not exist; replaces the specific color value with a predetermined color value in the second color space if the specific color information exists; and generates image data to be outputted by the output device.

4 Claims, 14 Drawing Sheets

FIG.4

| ATTRIBUTE INFORMATION (2 BITS) | | COLOR SPACE INFORMATION (3 BITS) | | | SPECIFIC COLOR INFORMATION (3 BITS) | | |
|---|---|---|---|---|---|---|---|
| 0 | 0 | 0 | 0 | 1 | 0 | 0 | 1 |
| 00:TEXT<br>01:GRAPHIC<br>10:IMAGE<br>11:NONE | | 000:GRAY<br>001:RGB<br>010:CMYK<br>011:SEPARATION<br>100:DEVICE N<br>101:CIE | | | 000:CMM<br>001:GRAY COMPENSATION<br>010:GRAY REPLACEMENT<br>011:SUBSTITUTION-COLOR REPLACEMENT | | |

FIG.5

| COLOR SPACE INFORMATION | COLOR VALUE | | | |
|---|---|---|---|---|
| | C SECTION | M SECTION | Y SECTION | K SECTION |
| 000:GRAY | 0 | 0 | 0 | GRAY COLOR VALUE |
| 001:RGB | R COLOR VALUE | G COLOR VALUE | B COLOR VALUE | 0 |
| 010:CMYK | C COLOR VALUE | M COLOR VALUE | Y COLOR VALUE | K COLOR VALUE |
| 011:SEPARATION | C COLOR VALUE | M COLOR VALUE | Y COLOR VALUE | K COLOR VALUE |
| 100:DEVICE N | COLOR VALUE OF SPOT COLOR 1 | COLOR VALUE OF SPOT COLOR 2 | COLOR VALUE OF SPOT COLOR 3 | COLOR VALUE OF SPOT COLOR 4 |
| 101:CIE | x COLOR VALUE | y COLOR VALUE | z COLOR VALUE | 0 |

IMAGE PROCESSING APPARATUS

BACKGROUND OF THE INVENTION

1. Field of the Invention

The present invention relates to an image processing apparatus.

2. Description of Related Art

In recent years, print data with the heavy use of bitmap data has often been used for printing for photo books, for example. Such print data is described in a page description language (PDL) and is rasterized by an analysis in a controller or an image forming apparatus to convert the color into a CMYK value. The print data converted into a CMYK value in this way is used for print in the image forming apparatus.

Rasterizing for bitmap data requires a larger volume of processing and a longer processing time in comparison with text data indicating images of characters and graphic data indicating images of a table or a graphic. This leads to a low print speed.

In print on demand (POD) as disclosed in Japanese Unexamined Patent Application Publication No. 9-193477, a print job which is sent from a personal computer (PC) connected to an image forming apparatus through a network is temporarily stored in a printer controller or the image forming apparatus. Print quality is then checked through test printing, and a job ticket or page data is edited. If an intended print quality is achieved, final printing is performed. These processes are executed as workflow including functions of so-called job storage, editing, and reprinting.

The technique described in Japanese Unexamined Patent Application Publication No. 9-193477 needs to rasterize print data for test printing every time a job ticket or page data is edited. This leads to low productivity.

SUMMARY OF THE INVENTION

The present invention provides an image processing apparatus that can efficiently achieve an intended print quality.

According to an aspect of the present invention, there is provided an image processing apparatus including: a storage unit; and a control unit that analyzes and rasterizes print data described in a page description language; generates raster data represented by a first color value in a first color space described in the print data, color space information indicating the first color space, and specific color information indicating that the first color value is a specific color value; stores the raster data in the storage unit in association with the color space information and the specific color information; determines whether the specific color information exists in association with the raster data stored in the storage unit; converts the first color value into a second color value in a second color space of an output device by performing calculation corresponding to the first color space if it is determined that the specific color information does not exist; replaces the specific color value with a predetermined color value in the second color space if it is determined that the specific color information exists; and generates image data to be outputted by the output device.

Preferably, in the image processing apparatus, the print data includes profile information for specifying a profile to convert the first color value into the second color value; and the control unit performs the calculation to convert the first color value into the second color value using the profile specified by the profile information.

Preferably, in the image processing apparatus, the control unit changes the profile to be used for the calculation to convert the first color value into the second color value.

Preferably, in the image processing apparatus, the control unit acquires attribute information indicating an attribute of an object of the raster data acquired through the analysis of the print data; and the control unit replaces the specific color value with the predetermined color value when the attribute information indicates a specific attribute.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 illustrates an exemplary data format of tag bits;

FIG. 5 illustrates an exemplary data format of raster data;

DESCRIPTION OF THE PREFERRED EMBODIMENTS

Figure 1:
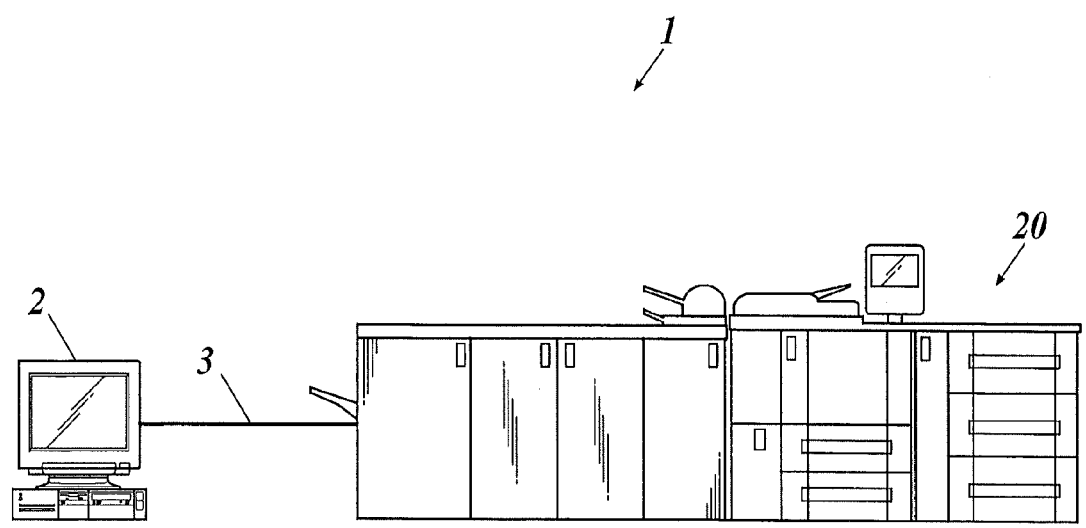
FIG. 1 is a system configuration diagram of an image forming system in an embodiment.

An image forming system according to an embodiment of the present invention will now be described with reference to the accompanying drawings. The scope of the present invention is however not limited to examples illustrated in these drawings. In the following description, elements having the same functions and configures are designated with the same reference numerals, and repetitive descriptions thereon will be omitted.

The image forming system 1 includes an image forming apparatus 20 and a client PC 2 as illustrated in FIG. 1.

Figure 2:
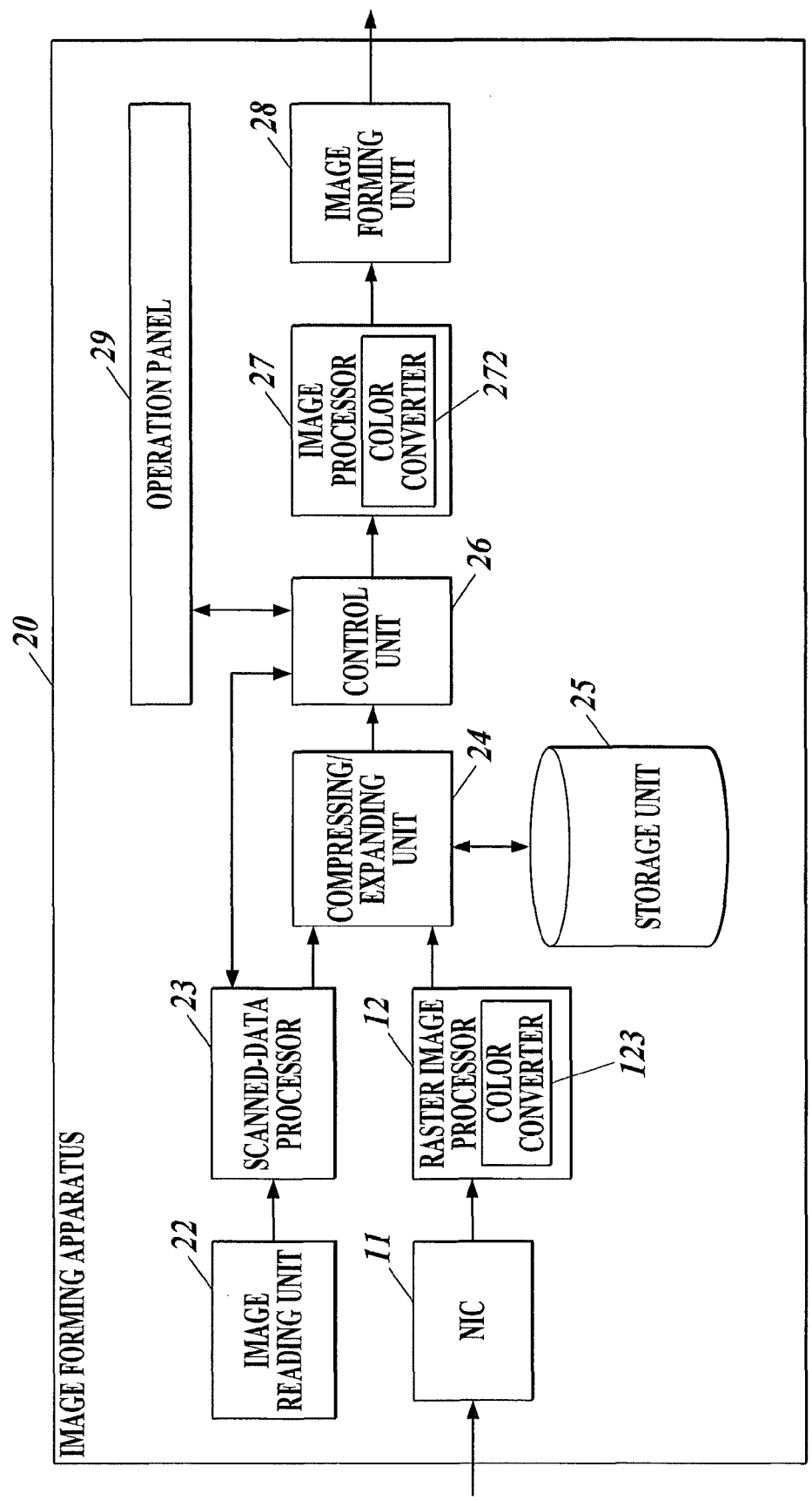
FIG. 2 is a functional block diagram illustrating the main configuration of an image forming apparatus.

The image forming apparatus 20 is communicatively connected to the client PC 2 through a local area network (LAN) 3. The image forming apparatus 20 receives a print job from the client PC 2 and processes the job through a raster image processor (RIP) to generate multivalued image data. As illustrated in FIG. 2, the image forming apparatus 20 also includes a scanned-data processor 23 that generates multivalued image data of a document read by an image reading unit 22.

The image forming apparatus 20 is so-called multi-functional peripherals (MFPs) to form an image on a print medium such as paper on the basis of multivalued image data generated as described above. The image forming apparatus 20 forms an image through an electrophotographic imaging process. The image forming apparatus 20 uses four coloring materials (toner) of C (cyan), M (magenta), Y (yellow), and K (black) as process colors for forming an image, but may be MFPs using other process colors for forming an image. The image forming system 1 including the image forming apparatus 20 using CMYK as process colors will be described below as an example.

As illustrated in FIG. 2, the image forming apparatus 20 includes a network interface card (NIC) 11, a raster image processor 12, the image reading unit 22, the scanned-data processor 23, a compressing/expanding unit 24, a storage unit 25, a control unit 26, an image processor 27, an image forming unit 28, and an operation panel 29.

The NIC 11 receives a print job described in a page description language (PDL) from the client PC 2 through the LAN 3. A print job includes a job ticket. The job ticket includes information on various settings for the job.

The raster image processor 12 analyzes a print job to rasterize a drawing object described in the print job, and generates raster data, i.e., multivalued image data represented by multivalued color values. The raster data is represented by color values of the original color space of the print job. The color space is the Gray, RGB, CMYK, Separation, DeviceN, or CIE color space. The raster image processor 12 uses the analyzed print job to generate tag bits including attribute information indicating the attribute of the drawing object for the raster data, color space information indicating the original color space of the print job for the raster data, and specific color information indicating whether a specific color replacement function is to be applied. The attribute of a drawing object is "Text" indicating a text form, "Graphic" indicating a graphic form, or "Image" indicating a photograph. The specific color replacement function is applied when a user requests that a specific color be constantly replaced with another color for print, and includes gray compensation, gray replacement, and substitution-color replacement. Gray compensation is a function to replace a color value of an image of a solid black character created in an application of the client PC 2 so that the image is formed as a solid black image with only K. Gray replacement is a function to replace a color value of a gray image created in an application of the client PC 2 so that the image is formed with only shading of K. Substitution-color replacement is a function to always replace a specific color value of an image described in a print job with another predetermined color value. Substitution-color replacement is used to output a red (R=255, G=0, B=0) represented in the RGB color space as a red (C=0, M=255, Y=255, K=0) in the CMYK color space, or to output a specific color represented in the RGB color space as another specific color in the CMYK color space. The color replacement function is not limited to the above functions, but other color replacement functions may be applicable. Tag bits include the attribute information, color space information, and specific color information for each pixel. The raster image processor 12 includes a color converter 123 that converts a color value described in raster data into a color value in a color space for print when a print job is not stored, as described below. The raster image processor 12 is controlled by the control unit 26. Raster data and tag bits generated in the raster image processor 12 are stored in a memory. The raster image processor 12 may be composed of dedicated hardware.

Figure 3:
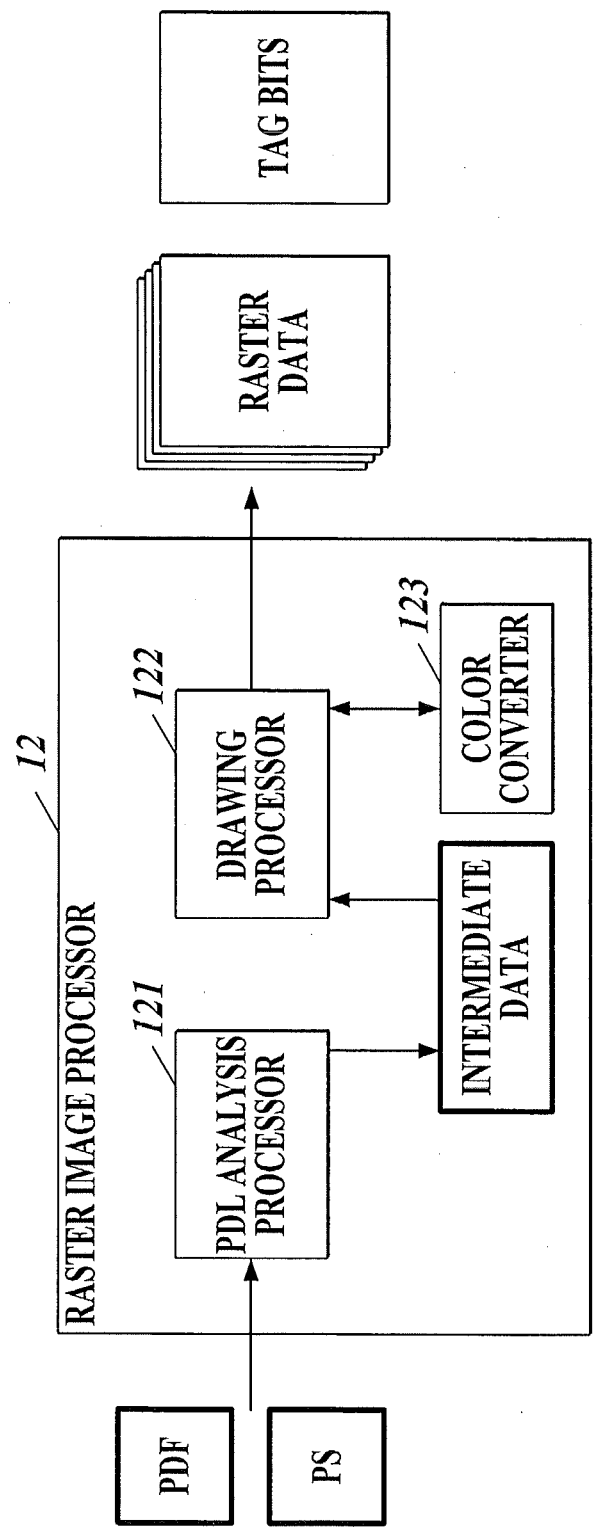
FIG. 3 is a block diagram illustrating a functional configuration of a raster image processor.

FIG. 3 illustrates an actual configuration of the raster image processor 12. The raster image processor 12 includes a PDL analysis processor 121, a drawing processor 122, and the color converter 123.

The PDL analysis processor 121 analyzes a command of PDL, such as PS (PostScript) and PDF (portable document format), received from the client PC 2 and converts the command into intermediate data including information (for example, coordinates, color values, and a color space) on a drawing object. The PDL analysis processor 121 generates intermediate data by writing a color value in the original color space of the analyzed print job as a color value in the drawing-object information.

The drawing processor 122 refers to the intermediate data, executes a drawing process under a condition suitable for characteristics of an output device (e.g., resolution and printing area) on the basis of the drawing-object information, and generates raster data and tag bits.

As tag bits, data of 1 byte (8 bits) is allocated to each pixel. As illustrated in FIG. 4, the data for each pixel in tag bits consists of attribute information indicated by upper 2 bits, color space information indicated by middle 3 bits, and specific color information indicated by lower 3 bits.

For example, as illustrated in FIG. 4, attribute information "00" indicates that a drawing object including the pixel has an attribute "Text", attribute information "01" indicates that a drawing object including the pixel has an attribute "Graphic", attribute information "10" indicates that a drawing object including the pixel has an attribute "Image", and attribute information "11" indicates that the pixel has an attribute "None" indicating that the pixel has no image data. Attribute information is described on the basis of the attribute of a drawing object described in drawing-object information in intermediate data.

Color space information "000" indicates that the original color space of a print job is the Gray color space. In the same way, color space information "001" indicates the RGB color space, color space information "010" indicates the CMYK color space, color space information "011" indicates the Separation color space, color space information "100" indicates the DeviceN color space, and color space information "101" indicates the CIE color space.

Specific color information "000" indicates that color conversion is to be performed using a profile on the basis of a function of a CMM (color management module), specific color information "001" indicates that gray compensation is to be performed, specific color information "010" indicates that gray replacement is to be performed, and specific color information "011" indicates that substitution-color replacement is to be performed. For example, "001" is described as the specific color information when a color value indicates a solid black color in the original color space of a print job; "010" is described when a color value indicates gray tone in the original color space of a print job; or "011" is described when drawing-object information includes replacement with a substitution color. Alternatively, whether to perform gray compensation or gray replacement may be determined on the basis of drawing-object information, and the information for gray compensation or gray replacement may be described on the basis of the determination result.

Data of tag bits illustrated in FIG. 4 therefore indicates that a drawing object including the pixel has an attribute "Text", that the original color space of a print job is the RGB color space, and that the pixel is a target of gray compensation.

As raster data, data of 4 bytes is allocated for each pixel. As illustrated in FIG. 5, the raster data for one pixel includes a data area of one byte for each of the C, M, Y, and K sections.

The value of each element in the original color space of a print job is described in each data area.

For example, when the original color space of a print job is the Gray color space, data of the pixel is as follows: C section=0, M section=0, Y section=0, and K section=(Gray color value). When the original color space of a print job is the RGB color space, data of the pixel is as follows: C section=(R color value), M section=(G color value), Y section=(B color value), and K section=0. When the original color space of a print job is the CMYK color space, data of the pixel is as follows: C section=(C color value), M section=(M color value), Y section=(Y color value), and K section=(K color value). When the original color space of a print job is the Separation or DeviceN color space, data of the pixel is as follows: C section=(C color value of Substitution Color), M section=(M color value of Substitution Color), Y section=(Y color value of Substitution Color), and K section=(K color value of Substitution Color). When the original color space of a print job is the CIE (XYZ) color space, data of the pixel is as follows: C section=(x color value), M section=(y color value), Y section=(z color value), and K section=0. Herein, a color value in XYZ color system is described in lower-case letters in distinction from Y (Yellow). An element of each color value represented in the DeviceN color space is a color predefined by a user.

As described above, the drawing processor 122 can generate raster data in the same data format as a conventional format based on CMYK sections.

In the Separation or DeviceN color space, the drawing processor 122 uses a CMYK value corresponding to a predefined spot-color name to generate raster data.

Figure 6A:
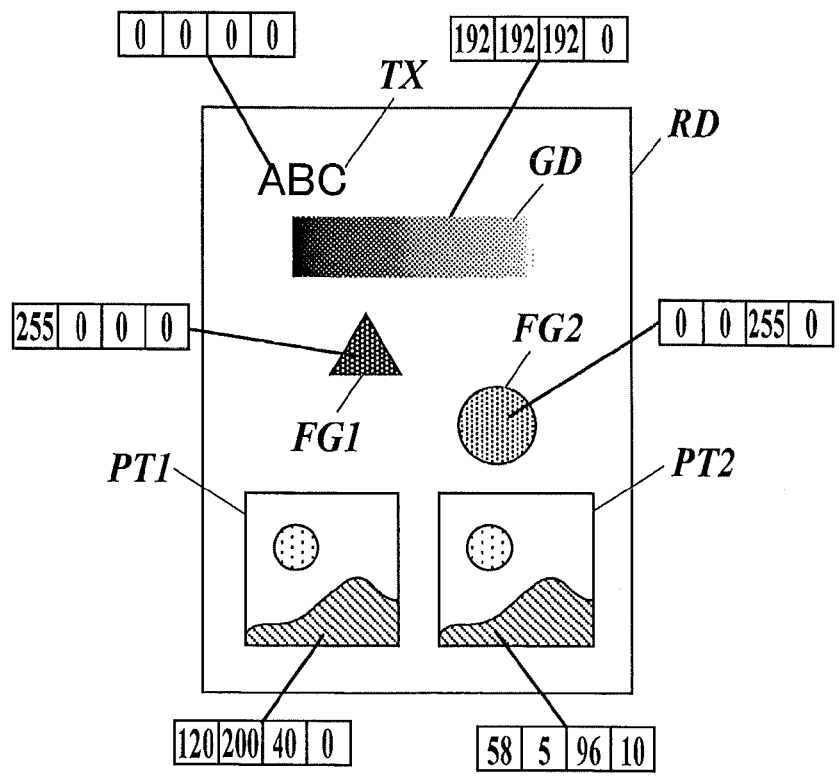
FIG. 6A illustrates an example of raster data.
Figure 6B:
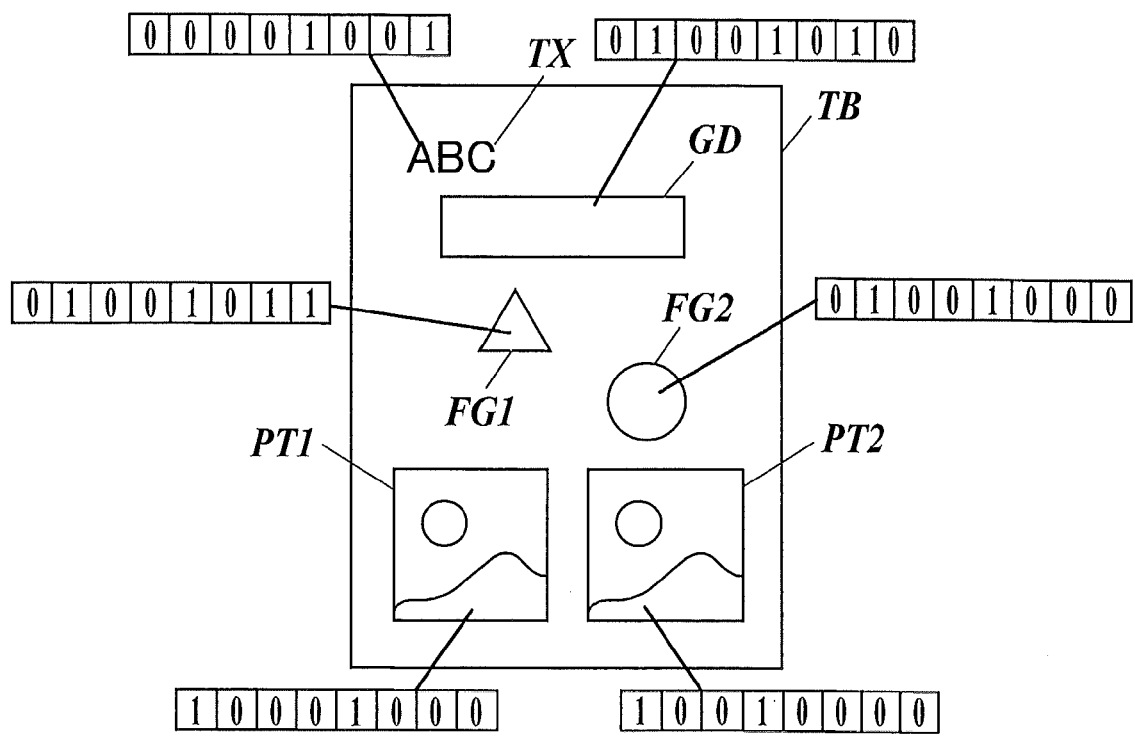
FIG. 6B illustrates an example of tag bits.

FIGS. 6A and 6B illustrate the relationship between raster data and tag bits.

Raster data illustrated in FIGS. 6A includes an object TX having an attribute "Text" described in the RGB color space; objects GD, FG1, and FG2 having an attribute "Graphic" described in the RGB color space; an object PT1 having an attribute "Image" described in the RGB color space; and an object PT2 having an attribute "Image" described in the CMYK color space.

For example, as illustrated in FIG. 6A, a pixel of the object TX has a color value of "R=0, G=0, and B=0", the data for the pixel being C section =0, M section=0, Y section=0, and K section=0.

A pixel of the object GD has a color value of "R=192, G=192, and B=192", the data for the pixel being C section =192, M section=192, Y section=192, and K section=0.

A pixel of the object FG1 has a color value of "R=255, G=0, and B=0", the data for the pixel being C section=255, M section=0, Y section=0, and K section=0.

A pixel of the object FG2 has a color value of "R=0,G=0, and B=255", the data for the pixel being C section=0, M section=0, Y section=255, and K section=0.

A pixel of the object PT1 has a color value of "R=120, G=200, and B=40", the data for the pixel being C section=120, M section=200, Y section=40, and K, section=0.

A pixel of the object PT2 has a color value of "C=58, M=5, Y=96, and K=10", the data for the pixel being C=section 58, M section=5, Y section=96, and K section=10.

The data of the tag bits for individual pixels illustrated in FIG. 6B corresponds to the pixels in raster data.

For example, as illustrated in FIG. 6B, the data for the corresponding pixel of the object TX is "00001001" indicating that the object including the pixel has an attribute "Text", that the original color space of the print job is the RGB color space, and that the pixel is a target of gray compensation. Since the pixel has a color value of "R=0, G=0, and B=0" in the original color space of the print job, it is determined that the object is a solid black image. Therefore, the data for lower 3 bits for the pixel is "001" which indicates gray compensation.

The data for the corresponding pixel of the object GD is "01001010" indicating that the object including the pixel has an attribute "Graphic", that the original color space of the print job is the RGB color space, and that the pixel is a target of gray replacement. Since the pixel has a color value of "R=192, G=192, and B=192", i.e., has the same value for R, G, and B in the original color space of the print job, it is determined that the object is a gray image. Therefore, the data for lower 3 bits for the pixel is "010" which indicates gray replacement.

The data for the corresponding pixel of the object FG1 is "01001011" indicating that the object including the pixel has an attribute "Graphic", that the original color space of the print job is the RGB color space, and that the pixel is a target of substitution-color replacement. Since drawing-object information includes information for replacement with a substitution color, the data for lower 3 bits for the pixel is "011" which indicates substitution-color replacement.

The data for the corresponding pixel of the object FG2 is "01001000" indicating that the object including the pixel has an attribute "Graphic", that the original color space of the print job is the RGB color space, and that the pixel is a target of color conversion using a profile.

The data for the corresponding pixel of the object PT1 is "10001000" indicating that the object including the pixel has an attribute "Image", that the original color space of the print job is the RGB color space, and that the pixel is a target of color conversion using a profile.

The data for the corresponding pixel of the object PT2 is "10010000" indicating that the object including the pixel has an attribute "Image", that the original color space of the print job is the CMYK color space, and that the pixel is a target of color conversion using a profile.

As described above, attribute information, color space information, and specific color information for each pixel in raster data can be acquired with reference to tag bits in the present embodiment.

The image reading unit 22 illustrated in FIG. 2 includes a light source and a CCD (charge coupled device) image sensor. Light emitted from the light source to a document for a scan is reflected and then received by the CCD image sensor, which performs photoelectric conversion to read the image of the document as R (Red), G (Green), and B (Blue) signals.

The scanned-data processor 23 acquires multivalued image data for the document read by the image reading unit 22 as raster data and generates tag bits including color space information indicating the color space (RGB) for the raster data. The scanned-data processor 23 is controlled by the control unit 26.

The image reading unit 22 and the scanned-data processor 23 may be omitted from the image forming apparatus 20.

The compressing/expanding unit 24 compresses and expands raster data and tag bits inputted from the raster image processor 12 or the scanned-data processor 23.

The storage unit 25 stores compressed raster data, tag bits, and job ticket.

The control unit 26 includes a CPU (central processing unit) and a RAM (random access memory). For example, the control unit 26 reads out specified program or data among system programs, various application programs, and various pieces of data stored in the storage unit 25, and expands the program or data in the RAM. The control unit 26 executes various processes in collaboration with the program expanded in the RAM and exerts centralized control over units of the image forming apparatus 20. More specifically, the control unit 26 exerts control for storing and printing data inputted from the raster image processor 12 or the scanned-data processor 23 and control for reading out data from the storage unit 25 for reprinting on the basis of an instruction from the operation panel 29.

The control unit 26 controls the storage unit 25 to store the raster data and tag bits, which are generated in the raster image processor 12 and compressed in the compressing/expanding unit 24, as a job file, in association with the job ticket.

The control unit 26 controls the storage unit 25 to store the raster data and tag bits, which are generated in the scanned-data processor 23 and compressed in the compressing/expanding unit 24, as a job file, in association with the job ticket created on the basis of input to the operation panel 29.

The control unit 26 reads out a job file stored in the storage unit 25 and controls the compressing/expanding unit 24 to expand the raster data and tag bits in the job file.

The image processor 27 performs color conversion for raster data on the basis of tag bits associated with the raster data and color-conversion-setting information in a job ticket, and executes other image processing to generate image data for print. The image processor 27 is controlled by the control unit 26. The image processor 27 may be composed of hardware such as an FPGA (field programmable gate array) and an ASIC (application specific integrated circuit).

Figure 7:
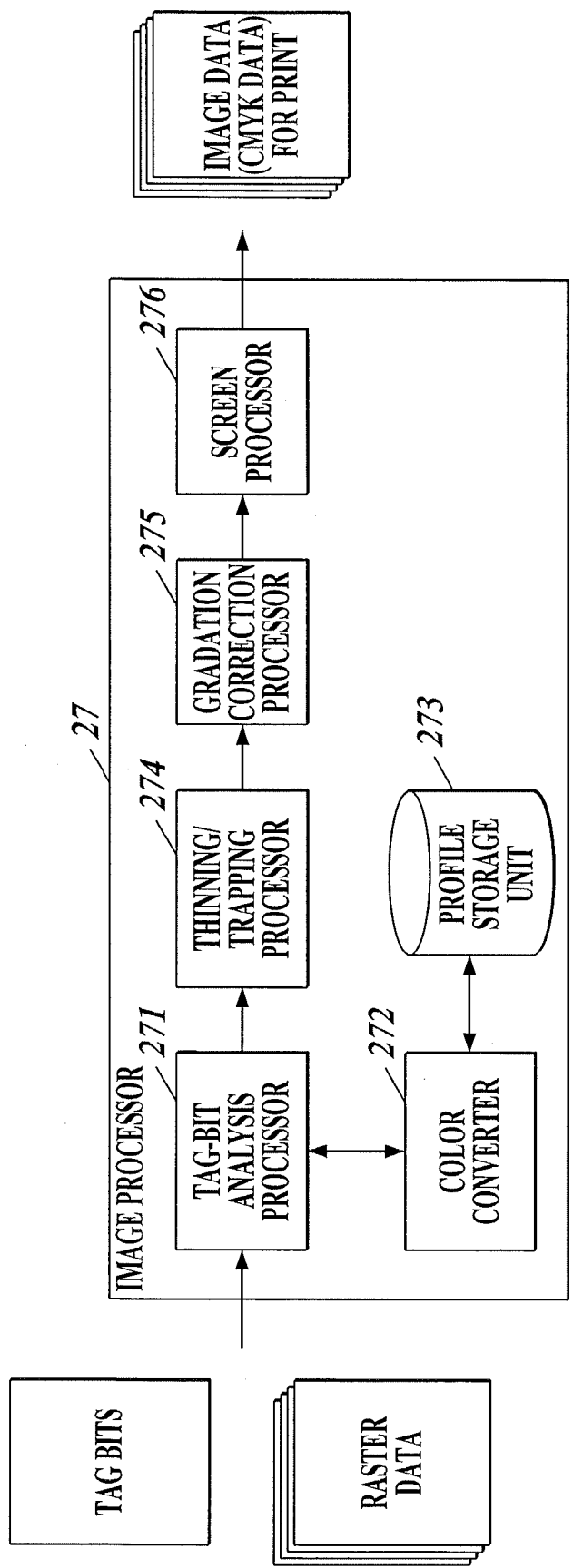
FIG. 7 is a block diagram illustrating a functional configuration of an image processor.

As illustrated in FIG. 7, the image processor 27 includes a tag-bit analysis processor 271, a color converter 272, a profile storage unit 273, a thinning/trapping processor 274, a gradation correction processor 275, and a screen processor 276.

The tag-bit analysis processor 271 analyzes tag bits that are read out from the storage unit 25 and expanded, and acquires attribute information, color space information, and specific color information for each pixel in the corresponding raster data.

The color converter 272 reads out a profile from the profile storage unit 273, which profile is specified in the color-conversion-setting information in the job ticket read out from the storage unit 25. The color converter 272 also expands the read-out profile in the RAM. A profile is created in an LUT (look up table) format.

The color converter 272 determines whether specific color information acquired from tag bits indicates that the pixel is a target of gray compensation, gray replacement, or substitution-color replacement; and determines whether the job ticket includes an instruction for performing gray compensation, gray replacement, or substitution-color replacement.

The color converter 272 replaces the color value of a target pixel with a predefined color value (CMYK value) when performing gray compensation, gray replacement, or substitution-color replacement.

On the other hand, when the specific color information indicates that the pixel is a target of color conversion using a profile; and when the pixel is a target of gray compensation, gray replacement, or substitution-color replacement but the job ticket does not include an instruction for performing gray compensation, gray replacement, or substitution-color replacement, the color converter 272 changes a profile to be used on the basis of the attribute information and the color space information acquired from the tag bits and converts the color value of the target pixel into a color value (CMYK value) in a color space capable of being outputted by the image forming apparatus 20.

An ICC (international color consortium) profile is employed as the profile to be used. The profile to be used includes a source profile and a printer profile.

The source profile includes data for conversion (mapping) from the original color space into the device-independent color space (for example, the CIE color space). For the CMYK color space, a profile in conformity to Japan Color or SWOP is widely used. For the RGB color space, sRGB or AdobeRGB is widely used.

The printer profile includes data for conversion (mapping) from the device-independent color space (for example, the CIE color space) into the color space for a printer, and is provided for each of the attributes of the objects and each type of paper such as coated/non-coated paper.

A profile can be specified that is created by a user with a profiler. Combination of a source profile and a printer profile, i.e., a device link profile can be specified.

For example, when an original color space is the CMYK color space, color values (C, M, Y, K) in CMYK sections are used for color conversion using a CMYK source profile and a printer profile (or a CMYK-CMYK conversion device link profile based on combination of these profiles). When an original color space is the RGB color space, color values (R, G, B) in CMY sections are used for color conversion using an RGB source profile and an RGB printer profile (or an RGB-CMYK conversion device link profile based on combination of these profiles). When an original color space is the CIE color space, color values (x, y, z) in CMY sections are used for color conversion using a printer profile.

As described above, the color converter 272 performs color conversion for each pixel in raster data.

Color conversion and color replacement is not limited to the above procedures. The color converter 272 may be composed of hardware for all or some of the processes.

The thinning/trapping processor 274 executes a thinning process and a trapping process on image data that has undergone color conversion as appropriate.

The gradation correction processor 275 executes gradation correction.

The screen processor 276 executes a screen process.

As illustrated in FIG. 2, the image forming unit 28 forms an image on the basis of image data (CMYK data) for print generated in the image processor 27.

The operation panel 29 is used for job operations such as copying, scanning, and printing; and status display and settings for the machine. For example, the operation panel 29 is used for instructions for editing the ticket of a job stored in the storage unit 25 and for reprinting an image. The operation panel 29 is also used for creating a job ticket for scanned data of a document read by the image reading unit 22. Equivalent operations may be implemented by remote control from the client PC 2 through a network.

In the image processor 27 of the image forming apparatus 20 in the present embodiment, a target pixel of gray compensation, gray replacement, and substitution-color replacement does not undergo color conversion using a profile, as described above. This can reduce the amount of calculation for color conversion and improves the processing efficiency of the color conversion. For example, when the profile to be used is changed by editing a job ticket for reprinting, the raster image process is not necessary each time in order to maintain a replaced color value for an image which is a target of gray compensation, gray replacement, and substitution-color replacement. This can efficiently achieve an intended print quality and increase productivity for reprinting.

Processes on the job reception in the image forming apparatus 20 will be described with reference to FIG. 8. The processes on the job reception are executed by the control unit 26 when a print job is received from the client PC 2.

The control unit 26 performs a PDL analysis process (Step S101).

Figure 9:
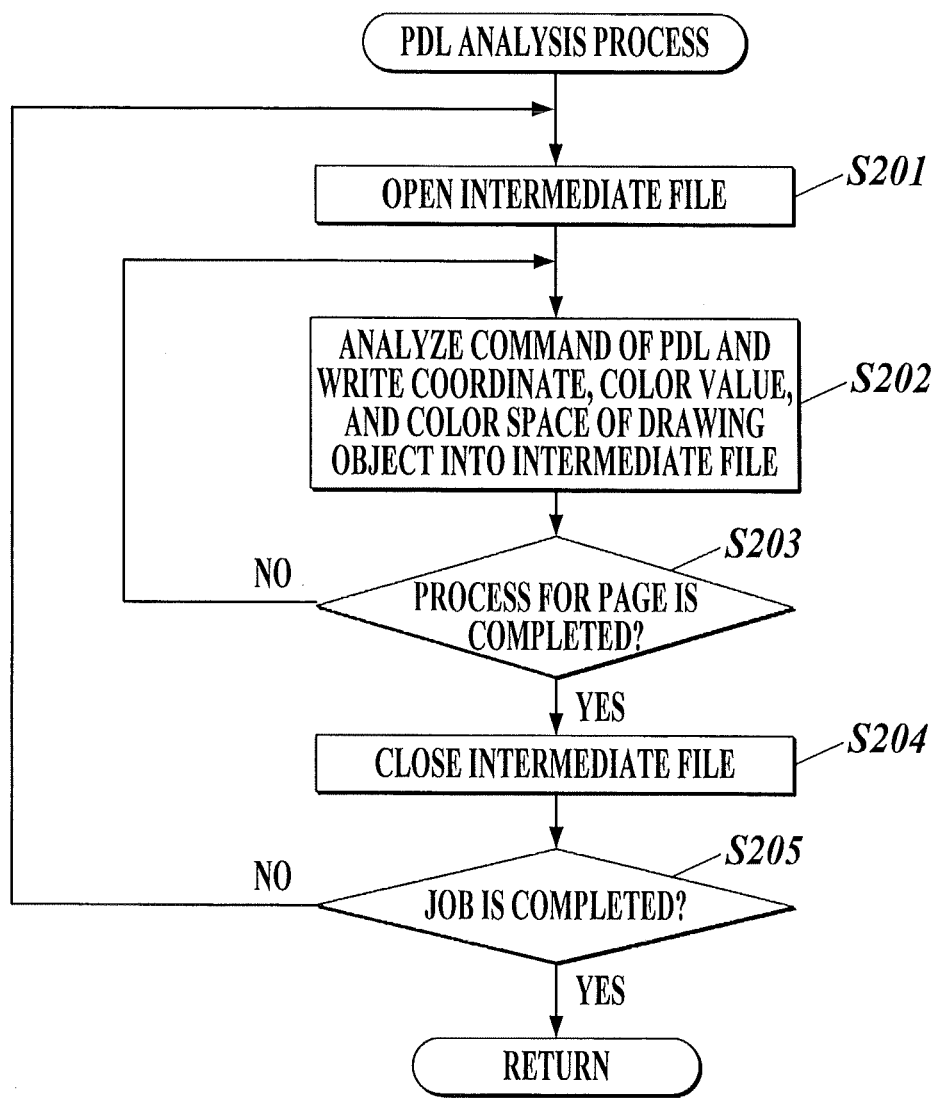
FIG. 9 is a flowchart illustrating a PDL analysis process.

The PDL analysis process will now be described with reference to FIG. 9.

The control unit 26 controls the PDL analysis processor 121 to open a file of intermediate data (hereinafter referred to as an intermediate file) (Step S201). Next, the control unit 26 controls the PDL analysis processor 121 to analyze a command of PDL and to write the coordinate, color value, and color space of a drawing object into the intermediate file (Step S202). The control unit 26 then determines whether a process for one page is completed (Step S203). If the process for one page is not completed (Step S203: N), the process goes to Step S202.

If a process for one page is completed (Step S203: Y), the control unit 26 controls the PDL analysis processor 121 to close the intermediate file (Step S204). Next, the control unit 26 determines whether a job is completed (Step S205). If the job is not completed (Step S205: N), the control unit 26 returns to Step S201 to repeat the above processes; and if the job is completed (Step S205: Y), the control unit 26 completes the PDL analysis process to and goes to Step S102 in FIG. 8.

The control unit 26 then executes a drawing process (Step S102).

Figure 10:
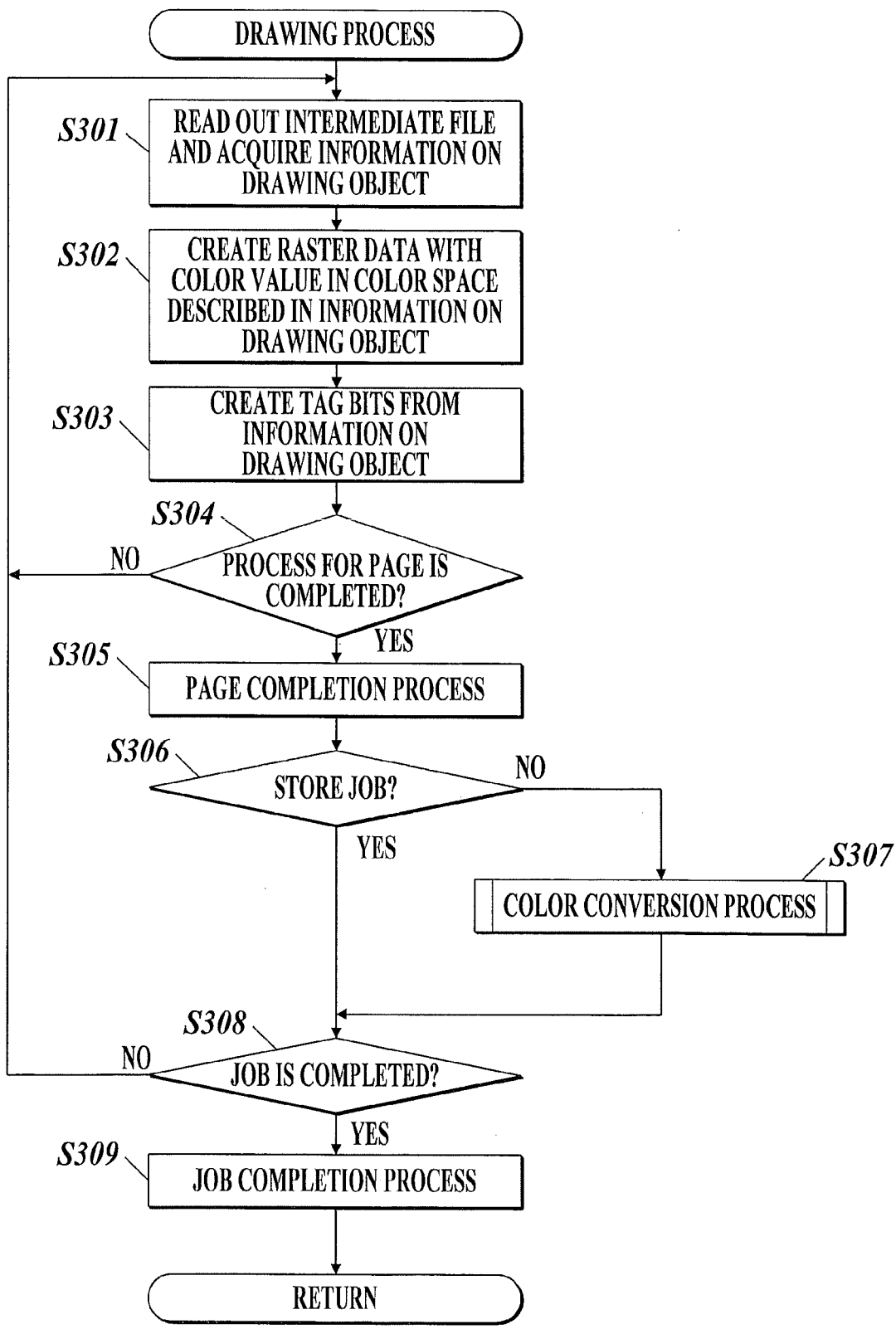
FIG. 10 is a flowchart illustrating a drawing process.

The drawing process will now be described with reference to FIG. 10.

The control unit 26 controls the drawing processor 122 to readout the intermediate file and acquire the drawing-object information (Step 301).

The control unit 26 then controls the drawing processor 122 to create raster data with a color value in the original color space of the print job described in the drawing-object information, as described above (Step 302). The control unit 26 also creates tag bits on the basis of the drawing-object information, as described above (Step 303).

The control unit 26 determines whether a process for one page is completed (Step S304). If the process for one page is not completed (Step S304: N), the process goes to Step S301; and if the process for one page is completed (Step S304: Y), the control unit 26 controls the drawing processor 122 to execute a predetermined page completion process (Step S305).

The control unit 26 then determines whether the job is to be stored (Step S306). If the job is not to be stored, i.e., if the received print job is to be printed without being stored (Step S306: N), the control unit 26 executes a color conversion process, described below, for the created raster data (Step S307). If the job is to be stored (Step S306: Y), the process of the control unit 26 goes to Step S308 instead of Step S307.

The control unit 26 determines whether the job is completed (Step S308). If the job is not completed (Step S308: N), the control unit 26 returns to Step S301 to repeat the above processes; and if the job is completed (Step S308: Y), the control unit 26 controls the drawing processor 122 to execute a predetermined job completion process (Step S309) and goes to Step S103 in FIG. 8.

The color conversion process in Step S307 will now be described with reference to FIG. 11.

The control unit 26 reads out data of a target pixel to be processed from the raster data (Step S401). The control unit 26 also reads out data of a target pixel to be processed from the tag bits and analyzes the data (Step S402).

The control unit 26 determines whether upper 2 bits in the tag bits represent attribute information "11" (Step S403). If the attribute information is not "11" (Step S403: N), the control unit 26 determines whether lower 3 bits in the tag bits represent specific color information "001" (Step S404). In other words, the control unit 26 determines whether the pixel is a target of gray compensation. If the attribute information is "11" (Step S403: Y), the control unit 26 determines that the target pixel forms no image, and goes to Step S412.

If the specific color information is "001" (Step S404: Y), the control unit 26 determines whether the job ticket includes an instruction for performing gray compensation (Step S405). If the job ticket includes an instruction for performing gray compensation (Step S405: Y), the control unit 26 replaces the color value of the target pixel in the raster data with a predefined color value (CMYK value) (Step S410). At this time, the control unit 26 replaces the color value with a solid black color value (C=0, M=0, Y=0, and K=255). After performing the process of Step S410, the control unit 26 goes to Step S412. If the job ticket does not include an instruction for performing gray compensation (Step S405: N), the control unit 26 uses a profile corresponding to the attribute information and color space information in the tag bits among profiles expanded in the RAM as described above, and converts the color value of the target pixel in the raster data into a CMYK color value in a color space capable of being outputted in the image forming unit 28 (Step S411). After performing the process of Step S411, the control unit 26 goes to Step S412.

If the specific color information is not "001" (Step S404: N), the control unit 26 determines whether the specific color information is "010" (Step S406). In other words, the control unit 26 determines whether the pixel is a target of gray replacement.

If the specific color information is "010" (Step S406: Y), the control unit 26 determines whether the job ticket includes an instruction for performing gray replacement (Step S407). If the job ticket includes an instruction for performing gray replacement (Step S407: Y), the control unit 26 performs the process of S410 described above. At this time, the control unit 26 replaces the color value with a color value corresponding to a color value in the original color space of the print job. For example, when a color value in the original color space of the print job is "R=192, G=192, and B=192", the control unit 26 replaces the color value with "C=0, M=0, Y=0, and K=64". If the job ticket does not include an instruction for performing gray replacement (Step S407: N), the control unit 26 performs the process of S411.

If the specific color information is not "010" (Step S406: N), the control unit 26 determines whether the specific color information is "011" (Step S408). In other words, the control unit 26 determines whether the pixel is a target of substitution-color replacement.

If the specific color information is "011" (Step S408: Y), the control unit 26 determines whether the job ticket includes an instruction for performing substitution-color replacement (Step S409). If the job ticket includes an instruction for performing substitution-color replacement (Step S409: Y), the control unit 26 performs the process of S410 described above. At this time, the control unit 26 replaces the color value with a color value corresponding to a color value in the original color space of the print job. For example, when a color value in the original color space of the print job is "R=255, G=0, and B=0", the control unit 26 replaces the color value with "C=0, M=255, Y=255, and K=0". If the job ticket does not include an instruction for performing substitution-color replacement (Step S409: N), the control unit 26 performs the process of S411.

If the specific color information is not "011" (Step S408: N), the control unit 26 performs the process of S411.

The control unit 26 determines whether the job is completed (Step S412). If the job is not completed (Step S412: N), the control unit 26 sets a next target pixel (Step S413) and then returns to Step S401 to repeat the above processes. If the job is completed (Step S412: Y), the control unit 26 completes the color conversion process.

Figure 8:
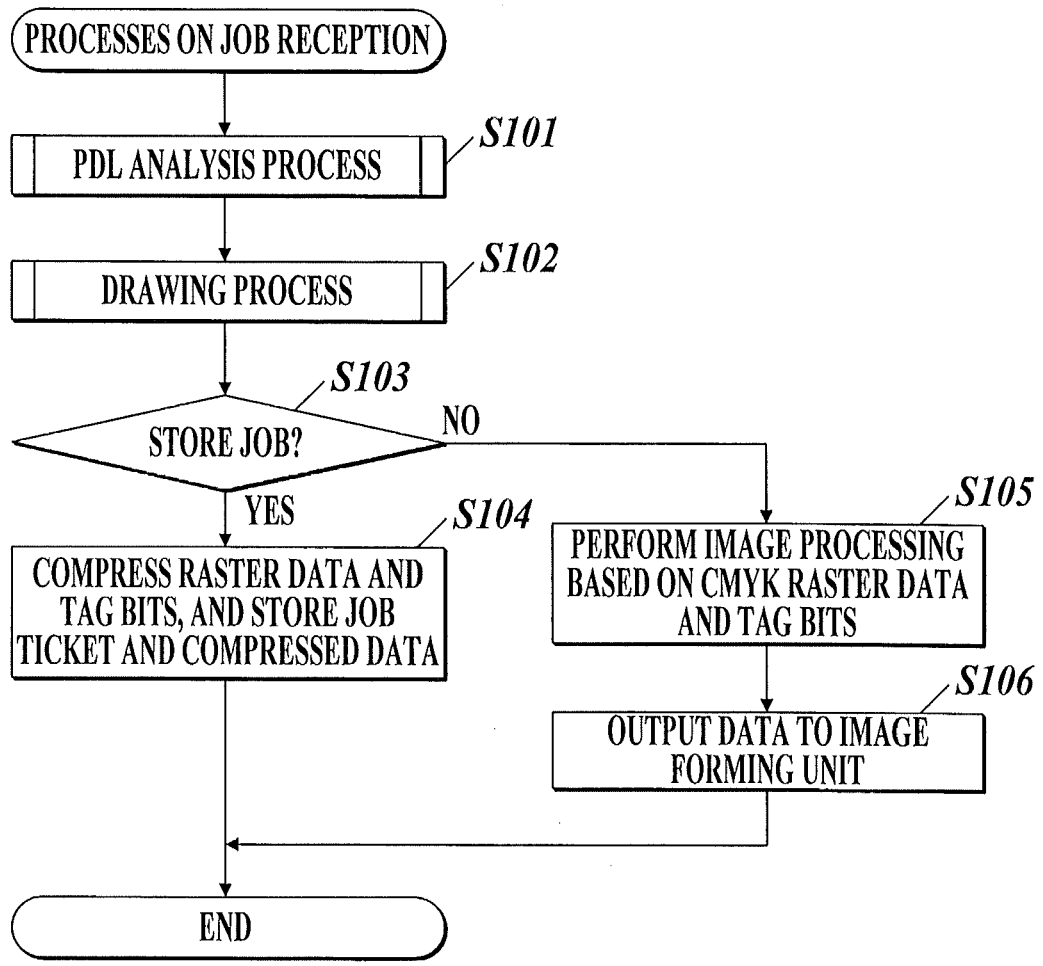
FIG. 8 is a flowchart illustrating processes on job reception.

When the drawing process is completed, the control unit 26 determines whether the job is to be stored, as illustrated in FIG. 8 (Step S103). If the job is to be stored (Step S103: Y), the control unit 26 controls the compressing/expanding unit 24 to compress the raster data and the tag bits, associate the compressed data with the job ticket, and store the associated data as a job file in the storage unit 25 (Step S104), and completes this process.

If the job is not to be stored (Step S103: N), the control unit 26 controls the image processor 27 to process an image on the basis of the tag bits and the raster data converted into a CMYK color value, and generates image data for print (Step S105). The control unit 26 outputs the generated image data for print to the image forming unit 28 (Step S106) and then completes this process.

Figure 12:
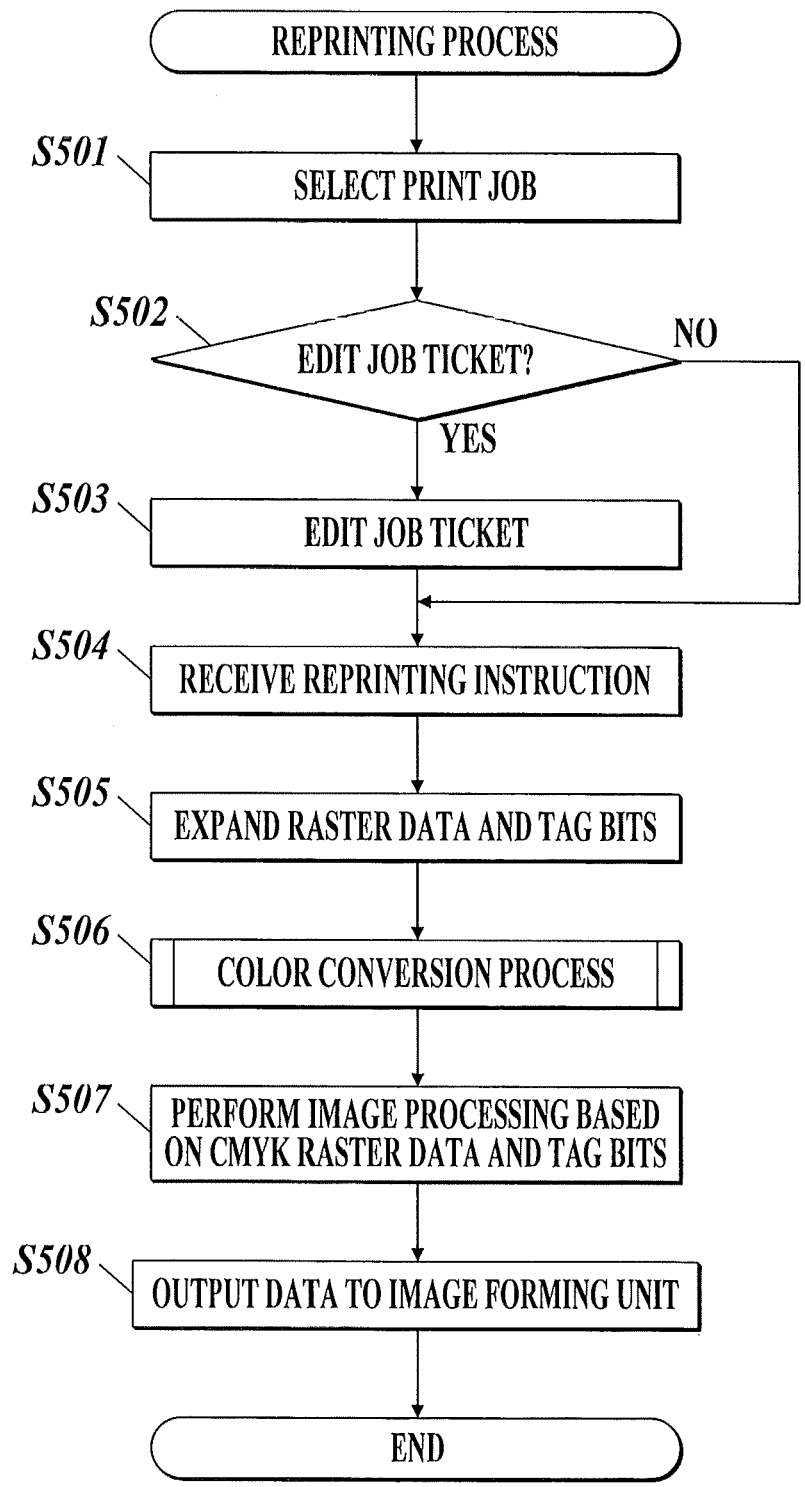
FIG. 12 is a flowchart illustrating a reprinting process.

A reprinting process will now be described with reference to FIG. 12. This reprinting process is executed by the control unit 26 when an instruction for reprinting is issued from the client PC 2 or the operation panel 29.

The control unit 26 selects and reads out a job file for reprinting from job files stored in the storage unit 25, on the basis of an instruction from the client PC 2 or an operation through the operation panel 29 (Step S501). The selected job file may be a job file that is created on the basis of a print job received from the client PC 2 or on the basis of data generated by the scanned-data processor 23.

The control unit 26 determines whether to edit a job ticket in the selected job file, on the basis of an instruction from the client PC 2 or an operation through the operation panel 29 (Step S502). If the job ticket is to be edited (Step S502: Y), the control unit 26 edits the job ticket on the basis of the instruction from the client PC 2 or the operation through the operation panel 29 (Step S503). The edition of a job ticket may include change of a profile to be used or change of an instruction as to whether to perform gray compensation, gray replacement, or substitution-color replacement. If the job ticket is not to be edited (Step S502: N), the control unit 26 skips Step S503 and performs the process of S504.

Figure 11:
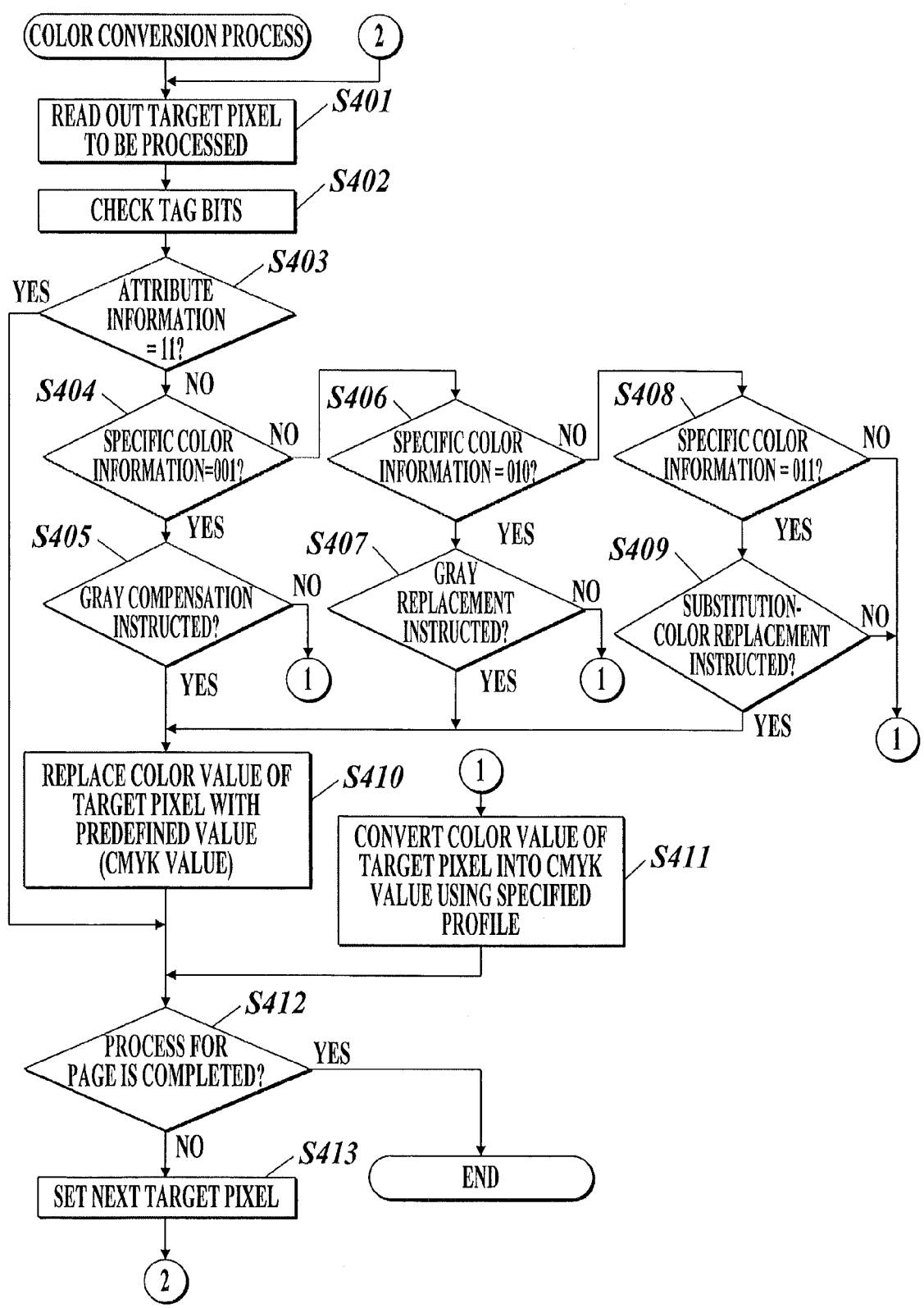
FIG. 11 is a flowchart illustrating a color conversion process.

The control unit 26 then receives an instruction for reprinting from the client PC 2 or through the operation panel 29 (Step S504), controls the compressing/expanding unit 24 to expand the raster data and the tag bits (Step S505), and executes the color conversion process described in FIG. 11 on the expanded raster data (Step S506). At this time, if the job ticket is edited in Step S503, the color conversion process is executed on the basis of the resultant job ticket.

After the color conversion process is completed, the control unit 26 controls the image processor 27 to process an image on the basis of the tag bits and the raster data converted into a CMYK color value, and generates image data for print (Step S507). The control unit 26 outputs the generated image data for print to the image forming unit 28 (Step S508) and then completes this process.

In the client PC 2 of the image forming system 1, setting windows on a screen of a display unit are used to issue instructions for storing a print job, reprinting, and printing. Examples of the setting windows will now be described with reference to FIGS. 13 and 14.

Figure 13:
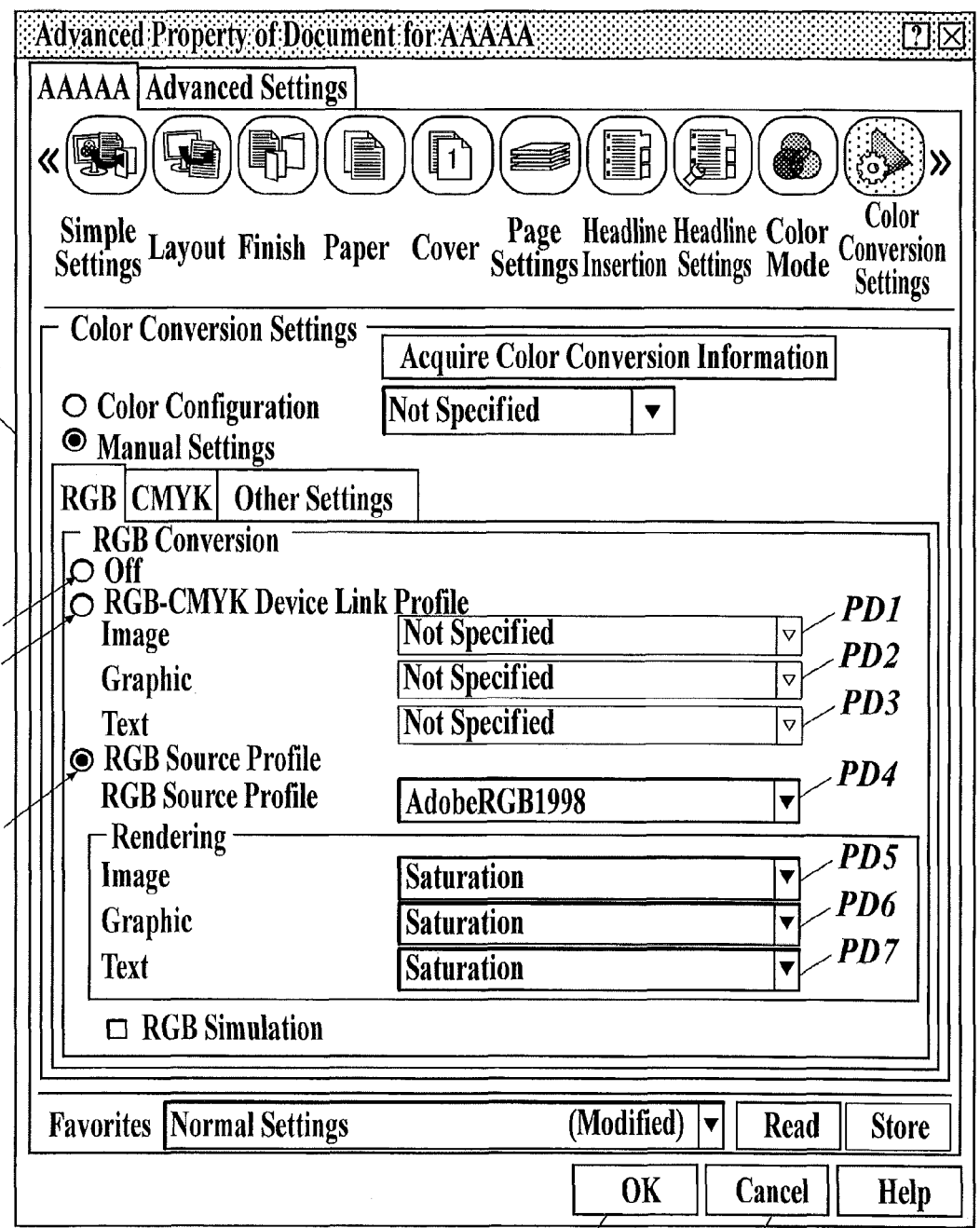
FIG. 13 illustrates a setting window displayed for issuing instructions for storing a print job, reprinting, and printing.

When a user issues an instruction as described above, a predetermined color conversion setting operation allows the display unit of the client PC 2 to display a property window PP1 as illustrated in FIG. 13 on the screen. On the property window PP1, a user can select and change a profile to be used for color conversion. FIG. 13 illustrates the screen in the case where the user selects an "RGB" tab. The user can select a profile to be used for color conversion from the RGB color space to the CMYK color space in an "RGB conversion" item displayed when the "RGB" tab is selected. Specifically, the user selects a radio button R1, R2, or R3.

If the radio button R1 is operated to select "Off", an instruction is issued so as to use a profile predetermined by default in a printer driver installed on the client PC 2 for color conversion from the RGB color space to the CMYK color space.

If the radio button R2 is operated to select "RGB-CMYK Device Link Profile", pull-down menus PD1 to PD3 can be operated to select a device link profile to be used for each attribute of a drawing object.

If the radio button R3 is operated to select "RGB Source Profile", a pull-down menu PD4 can be operated to select a profile to be used from different RGB source profiles such as sRGB and AdobeRGB profiles described above. Additionally, pull-down menus PD5 to PD7 can be operated to select a rendering intent to be applied for each attribute of a drawing object. A desired printer profile thereby can be selected for color conversion for each attribute of a drawing object from a plurality of printer profiles having different mapping systems depending on a rendering intent to be applied.

If the user selects a "CMYK" tab, a profile to be used for color conversion from the CMYK color space to the CMYK color space can also be selected as described above.

If the user operates an "OK" button B1 on the property window PP1 illustrated in FIG. 13, the client PC 2 creates a job ticket having a content that is set by the user to transmit a print job including the job ticket to the image forming apparatus 20. If the user operates a "Cancel" button B2, the content that is set by the user is completely discarded to cancel an instruction for storing the job, reprinting, or printing.

Figure 14:
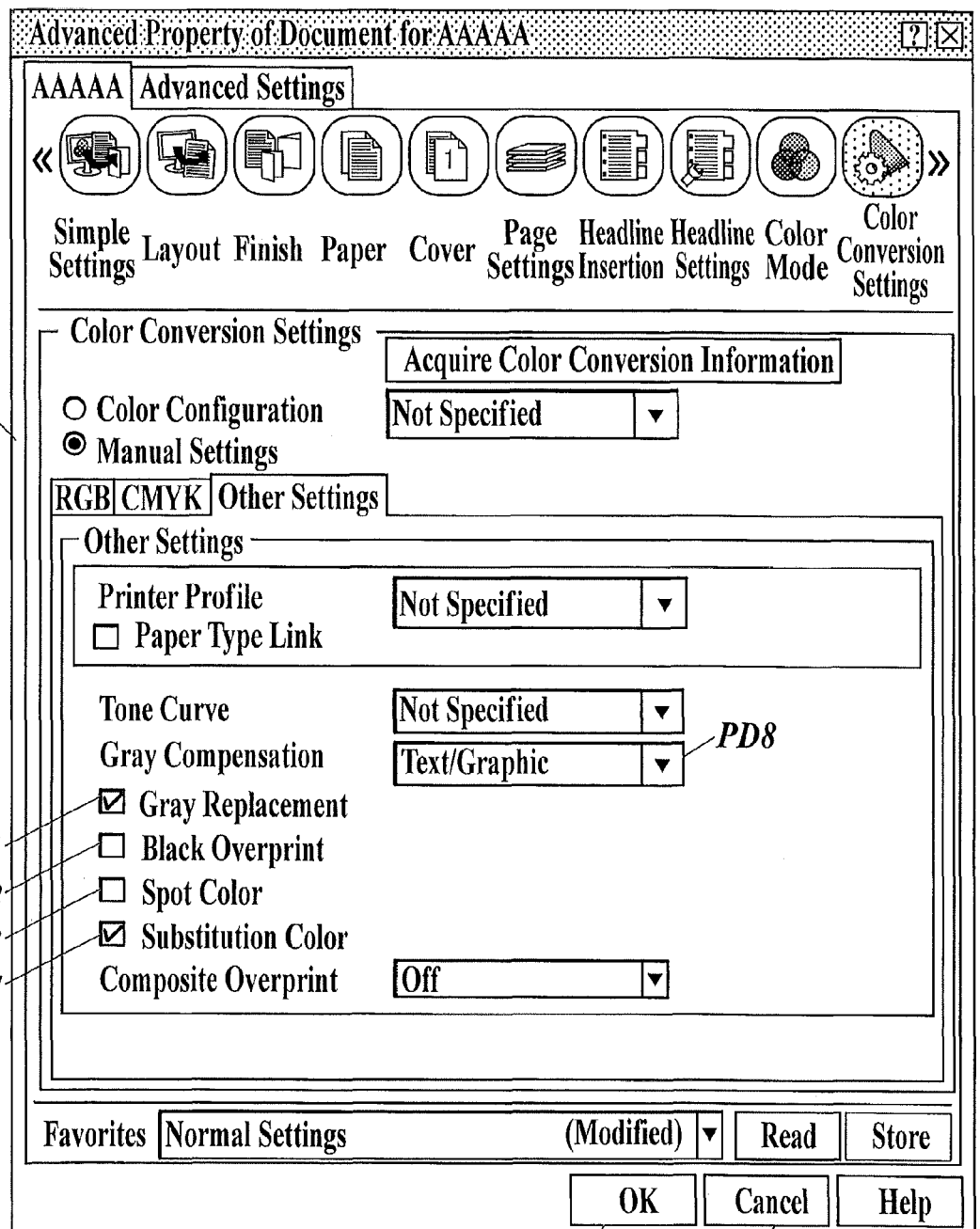
FIG. 14 illustrates a setting window displayed for issuing instructions for storing a print job, reprinting, and printing.

If the user selects an "Other Settings" tab, a property window PP2 as illustrated in FIG. 14 is displayed on the screen of the display unit of the client PC 2. The user can issue an instruction for gray compensation, gray replacement, or substitution-color replacement in the "Other Settings" item displayed when the "Other Settings" tab is selected. Specifically, the user can select the attribute of a drawing object, which undergoes gray compensation, from a pull-down menu PD8. The user can also check a check box CB1 to issue an instruction for performing gray replacement. The user can also check a check box CB2 to issue an instruction for applying black overprint. The user can also check a check box CB3 to issue an instruction for applying spot color. The user can also check a check box CB4 to issue an instruction for performing substitution-color replacement. An "OK" button B1 and a "Cancel" button B2 have a function similar to the buttons on the property window PP1 in FIG. 13. Repetitive descriptions thereon will therefore be omitted.

According to the present embodiment as described above, the control unit 26 analyzes and rasterizes a print job described in a page description language to generate raster data represented by a color value (first color value) in a color space (first color space) described in the print job, color space information indicating the first color space of the raster data, and specific color information indicating that the first color value of the raster data is a specific color value. The control unit 26 stores the raster data in the storage unit 25 in association with the color space information and the specific color information. The control unit 26 determines whether the specific color information exists in association with the raster data stored in the storage unit 25. If control unit 26 determines that the specific color information does not exist, the control unit 26 converts the first color value for the raster data into a color value (second color value) in a color space (second color space) of the image forming unit 28 by performing calculation corresponding to the first color space indicated by the color space information associated with the raster data. If the control unit 26 determines that the specific color information exists, the control unit 26 replaces the raster data represented by the specific color value with a predetermined color value in the second color space of the image forming unit 28. Thus, the control unit 26 generates image data to be outputted by the image forming unit 28. As a result, if the specific color information exists, conversion into a color value in a color space for output can be achieved without calculation using a profile. This can improve the processing efficiency of the color conversion. Additionally, when the profile to be used is edited or changed for reprinting, rasterizing based on the print data is not necessary each time in order to maintain a replaced color value for an image having a specific color. This can efficiently achieve an intended print quality and increase productivity.

According to the present embodiment, the control unit 26 performs calculation to convert the first color value for the raster data into the second color value in the second color space of in the image forming unit 28 using the profile specified by the print job. Color reproducibility intended by a user can thereby be achieved, which improves usability.

According to the present embodiment, the control unit 26 changes the profile to be used for calculation to convert the first color value for the raster data into the second color value in the second color space of the image forming unit 28. A user can thereby perform reprinting while changing the profile. Thus, intended color reproducibility can be achieved in a simple manner.

According to the present embodiment, if attribute information, which indicates an attribute of a drawing object of the raster data acquired through the analysis of the print job, indicates a specific attribute, the control unit 26 replaces the specific color value for the raster data with a predetermined color value in the second color space of the image forming unit 28. As a result, a user can select any one of color conversion using a profile and conversion into a predetermined color value, which improves usability.

The present embodiment have been described as an example of the image forming system according to the present invention, which is not limited to this example. Detailed configurations and operations of the functional units in the image forming system can be properly modified.

Figure 15:
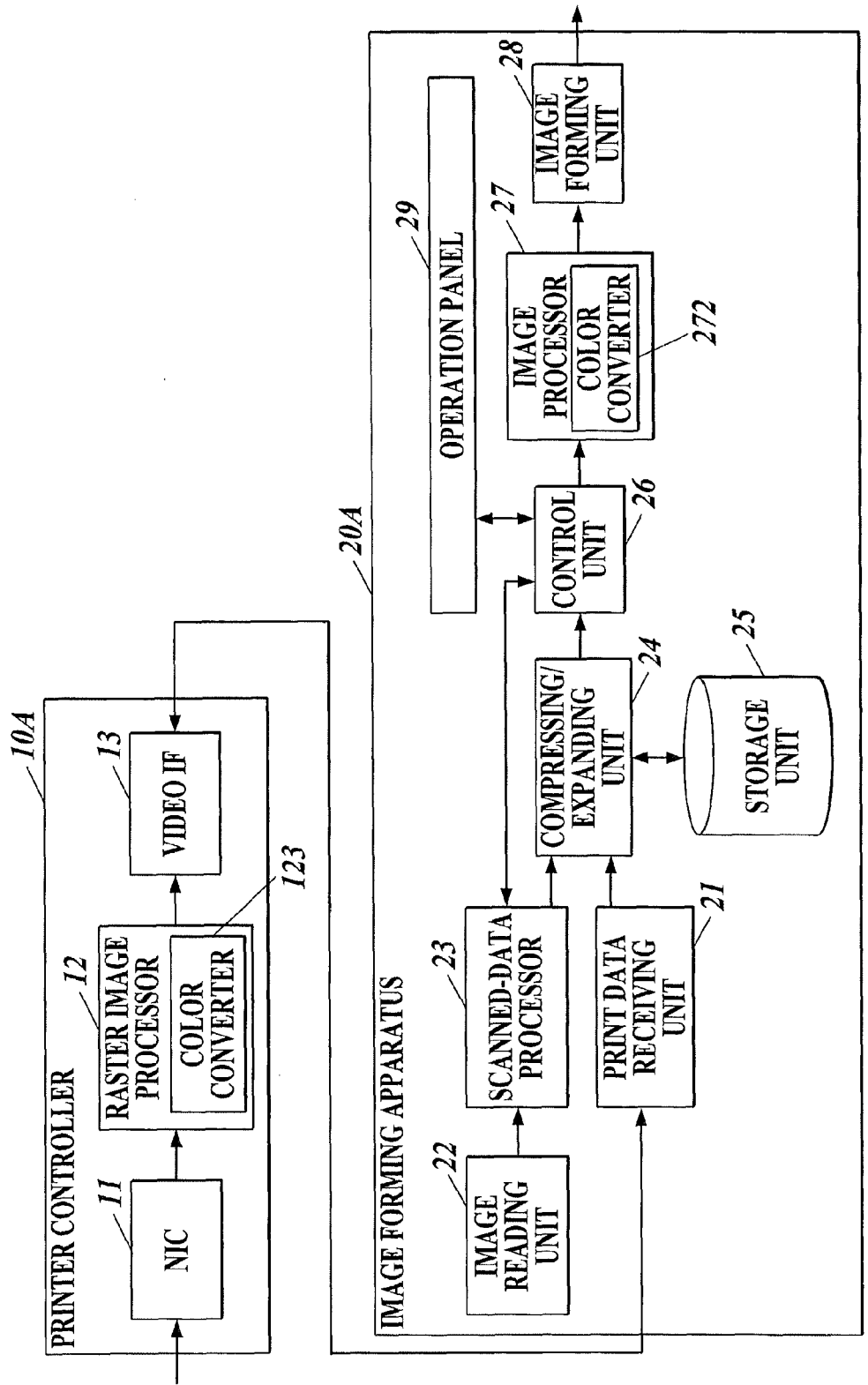
FIG. 15 is a system configuration diagram illustrating another example of image forming system.

Although the raster image processor 12 in the present embodiment is included in the image forming apparatus 20 a printer controller 10A provided between an image forming apparatus 20A and a client PC 2 may include the raster image processor 12 as illustrated in FIG. 15. In this case, functions of the control unit are implemented by a control unit 26 of the image forming apparatus 20A and the printer controller 10A.

More specifically, the printer controller 10A includes a NIC 11, the raster image processor 12, and a video interface (IF) 13 as illustrated in FIG. 15. The printer controller 10A is communicatively connected to the client PC 2 through a LAN 3. The printer controller 10A receives a print job from the client PC 2 through the NIC 11 and generates raster data, tag bits, and a job ticket through the above-described raster image process in the raster image processor 12. The printer controller 10A and the image forming apparatus 20A are connected with each other through the video IF 13. The generated raster data, tag bits, and job ticket are outputted from the video IF 13 to the image forming apparatus 20A through a video IF line. The image forming apparatus 20A includes a print data receiving unit 21 that receives the raster data, tag bits, and job ticket transmitted from the printer controller 10A.

In the present embodiment, when raster data is created, a color value in an original color space of a print job is maintained for data of a target pixel for gray compensation, gray replacement, and substitution-color replacement. Alternatively, when raster data is created, data of a target pixel of gray compensation, gray replacement, and substitution-color replacement may preliminarily be converted to a color value in a color space of an output device.

In the present embodiment, tag bits are created regardless of whether a job is to be stored. Alternatively, tag bits need not be created when a received print job is printed without being stored.

In the present embodiment, one of multiple profiles is selected for color conversion and the profile is changed depending on the attribute of a drawing object. Alternatively, only a single profile may be used for color conversion.

In the present embodiment, a profile to be used can be changed by editing the job ticket of a stored job. Alternatively, the profile may be unchangeable.

The present embodiment can change settings on whether to perform gray compensation, gray replacement, or substitution-color replacement. Alternatively, the settings may be unchangeable.

The present embodiment can select the type of attribute of a drawing object that is a target of gray compensation. Alternatively, the type may be unselectable. For example, a drawing object having an attribute "Text" may always undergo gray compensation.

In the present embodiment, a computer-readable medium for the program according to the present invention is composed of a hard disk or a nonvolatile semiconductor memory as an example. The present invention is however not limited to this example. The computer-readable medium may be composed of a portable recording medium such as a CD-ROM. A carrier wave may also be used as a medium for providing data of a program according to the present invention through a communication line.

The entire disclosure of Japanese Patent Application No. 2011-247347 filed on Nov. 11, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus comprising:
a storage unit; and
a control unit that analyzes and rasterizes print data described in a page description language; generates raster data represented by a first color value in a first color space described in the print data, color space information indicating the first color space, and specific color information indicating that the first color value is a specific color value; stores the raster data in the storage unit in association with the color space information and the specific color information; determines whether the specific color information exists in association with the raster data stored in the storage unit; converts the first color value into a second color value in a second color space of an output device by performing calculation corresponding to the first color space if it is determined that the specific color information does not exist; replaces the specific color value with a predetermined color value in the second color space if it is determined that the specific color information exists; and generates image data to be outputted by the output device.

2. The image processing apparatus according to claim 1, wherein
the print data includes profile information for specifying a profile to convert the first color value into the second color value; and
the control unit performs the calculation to convert the first color value into the second color value using the profile specified by the profile information.

3. The image processing apparatus according to claim 2, wherein
the control unit changes the profile to be used for the calculation to convert the first color value into the second color value.

4. The image processing apparatus according to claim 1, wherein
the control unit acquires attribute information indicating an attribute of an object of the raster data acquired through the analysis of the print data; and
the control unit replaces the specific color value with the predetermined color value when the attribute information indicates a specific attribute.

* * * * *